(No Model.)
J. B. HOWELL.
RUNNING GEAR FOR VEHICLES.
No. 302,406. Patented July 22, 1884.
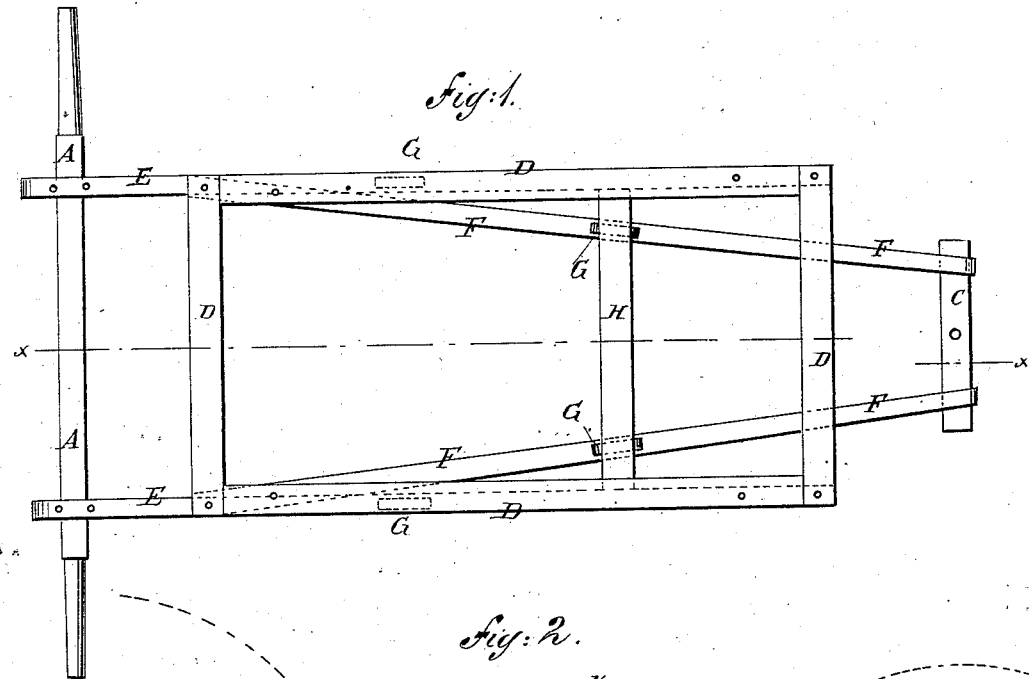
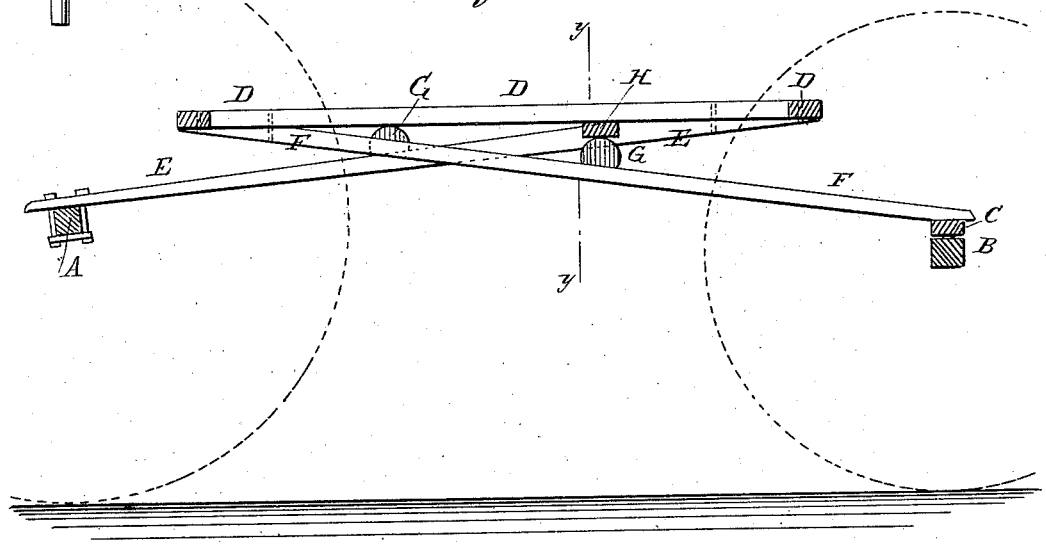
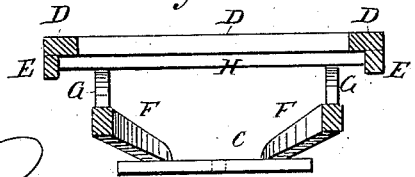
WITNESSES:
INVENTOR:
J. B. Howell
BY Munn & Co
ATTORNEYS.

UNITED STATES PATENT OFFICE.

JOHN BEATTY HOWELL, OF ALLENTOWN, NEW JERSEY.

RUNNING-GEAR FOR VEHICLES.

SPECIFICATION forming part of Letters Patent No. 302,406, dated July 22, 1884.

Application filed November 21, 1883. (No model.)

*To all whom it may concern:*

Be it known that I, JOHN BEATTY HOWELL, of Allentown, in the county of Monmouth and State of New Jersey, have invented a new and useful Improvement in Running-Gears for Vehicles, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a sectional side elevation of the same, taken through the line $x\,x$, Fig. 1. Fig. 3 is a sectional end elevation of the same, taken through the line $y\,y$, Fig. 2.

The object of this invention is to promote the elasticity, strength, and durability of the running-gear of vehicles.

The invention consists in the construction and arrangement of parts, as will be hereinafter described and claimed.

A represents the rear axle, B the forward axle, C the head-block, and D the body-frame, of a vehicle.

To the end parts of the rear axle, A, are attached the rear ends of two spring-bars, E, the forward ends of which are attached to the lower sides of the forward ends of the side bars of the body-frame D.

To the end parts of the head-block C are attached the forward ends of two spring-bars, F, which incline outward, and are attached at their rear ends to the lower side of the rear ends of the side bars of the body-frame D.

To the middle parts of the spring-bars E F are attached fulcrumed blocks G, of rubber or other suitable material. Upon the rear pair of blocks G rest the side bars of the body-frame D, and upon the forward pair of blocks G rests a cross-bar, H, the ends of which are attached to the lower sides of the side bars of the frame D, so as to give greater susceptibility to the said spring-bars. By this construction the running-gear will have great elasticity, strength, and durability, so that it will be well adapted for use on rough and rocky roads.

I am aware that it is not new to connect the frame of a vehicle at its forward and rear ends to the forward and rear bolsters by means of spring-bars extending from the forward under side of the frame to the rear bolster, and from the rear under side of the frame to the front bolster, said spring-bars being secured together by a cross-piece at their centers, and having cross-pieces between said bars in front and rear of their centers, and I do not desire to claim such construction, as my improvement is designed to do away with the above cross-bars and leave the centers of the bars disconnected, and provide elastic fulcrum-blocks between the two sets of spring-bars in front and rear of the place where said bars cross each other.

Having thus described my invention, I claim as new and desire to secure by Letters Patent—

The combination of the frame D, provided with the cross-bar H forward of the center thereof, with the two forwardly and inwardly inclined spring-bars F, secured to the rear under end of said frame, and connected with the head-block C, and the two parallel rearwardly-inclined spring-bars E of the said frame and connected with the axle, and two pairs of elastic fulcrum-blocks secured, respectively, between the cross-bar H and spring-bars F and between the parallel spring-bars E and the frame D, in rear of the center of said frame, substantially as set forth.

JOHN BEATTY HOWELL.

Witnesses:
W. S. PARSONS,
C. W. TAMANY.